July 16, 1968
R. W. DORST
3,393,109
METHOD OF FORMING BLOCK SANDWICH CONSTRUCTION
FOR BOAT HULLS AND THE LIKE
Filed July 19, 1965
2 Sheets-Sheet 1
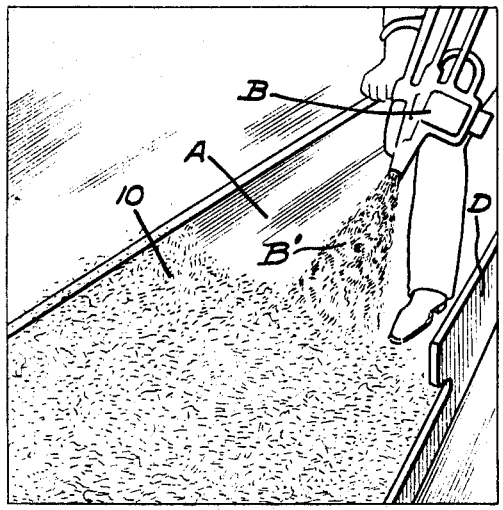
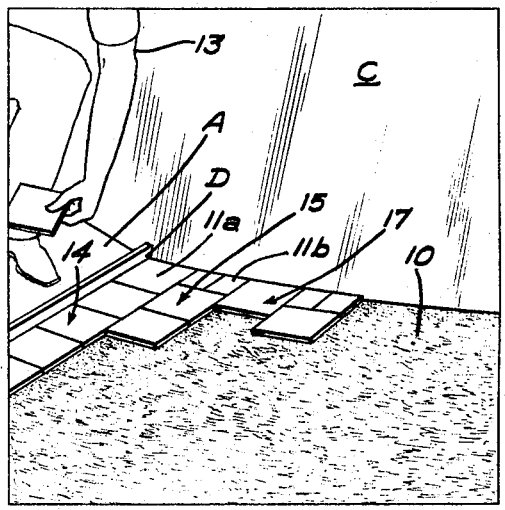
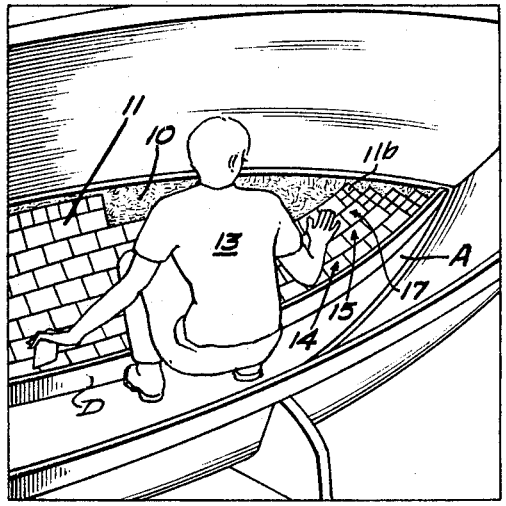
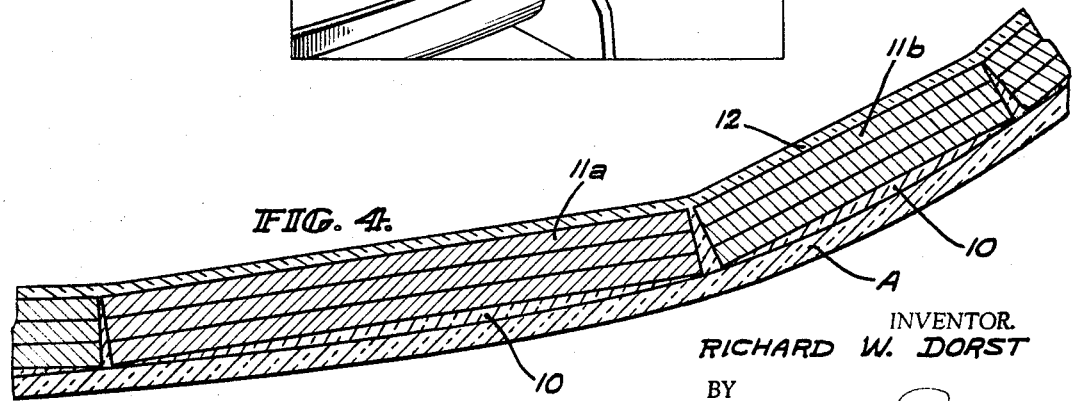
INVENTOR.
RICHARD W. DORST
BY
Hansen and Lane
ATTORNEYS.

July 16, 1968
R. W. DORST
3,393,109
METHOD OF FORMING BLOCK SANDWICH CONSTRUCTION
FOR BOAT HULLS AND THE LIKE
Filed July 19, 1965
2 Sheets-Sheet 2
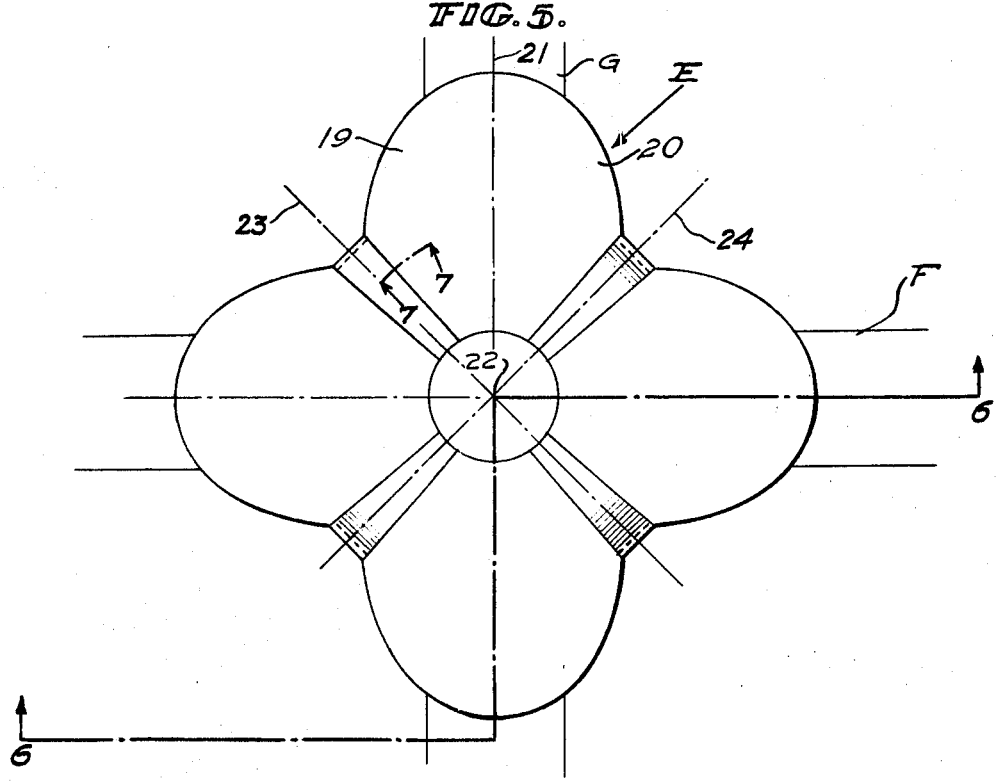
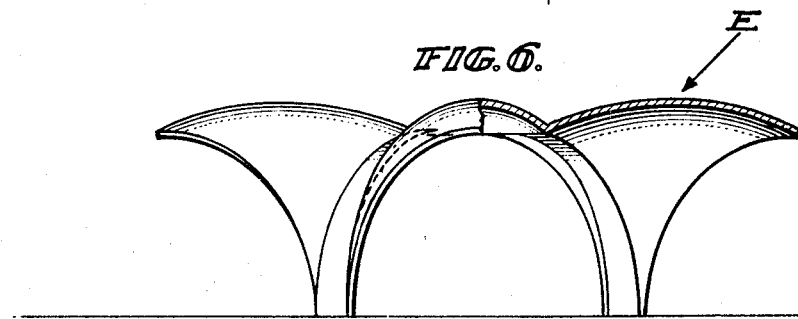
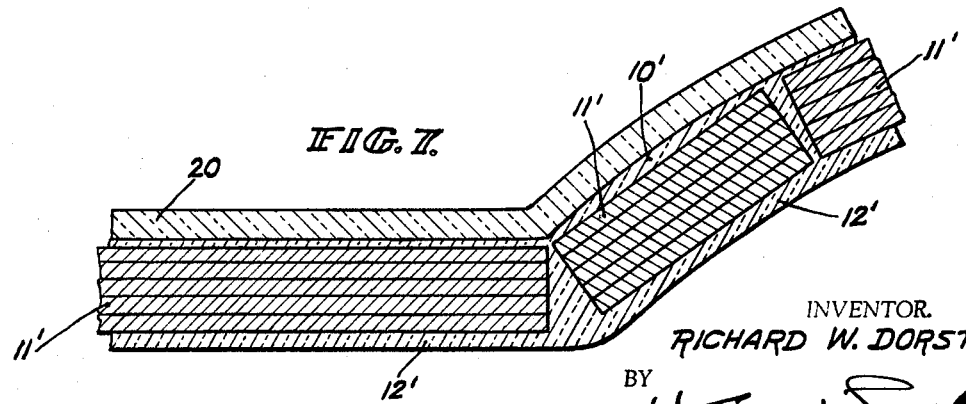
INVENTOR.
RICHARD W. DORST
BY
Hansen & Jauck
ATTORNEYS.

United States Patent Office 3,393,109
Patented July 16, 1968

3,393,109
METHOD OF FORMING BLOCK SANDWICH CONSTRUCTION FOR BOAT HULLS AND THE LIKE
Richard W. Dorst, 2550 Scott Blvd.,
Santa Clara, Calif. 95050
Filed July 19, 1965, Ser. No. 472,840
1 Claim. (Cl. 156—279)

ABSTRACT OF THE DISCLOSURE

The method of providing a strong, stiff, sandwich structure for boat hulls and other structures wherein a first layer of glass fiber saturated with liquid resin material is applied to a surface, such as the interior of a boat hull, and while the resin is still unset applying a layer of plywood blocks, one at a time, to the inner surface of the resin saturated glass fiber material, each block as it is laid being initially spaced by a selected distance from an adjoining structure or preceding block, and then moved under downward pressure toward such structure or preceding block so as to embed each newly laid block in the resin saturated glass fiber material and express some of the unset resin and glass fibers of said material upwardly to fill the spaces between the blocks, and then applying a second layer of resin saturated glass fiber material over the blocks to cover the blocks and bond to the material filling the spaces between the blocks so that the latter material forms a through-bonding for the sandwich construction thus formed.

---

In recent years in boat construction, both motor and sail, and in many other structures, including buildings, the trend has been toward an increased use of molded glass fiber saturated or set in activated resin, and commonly referred to as fiberglass. The term "fiberglass" is thus used as a noun throughout the boat and other industries in contradistinction to the Trademark "Fiberglas" which is applied to the glass fiber products such as glass fiber cloth, glass fiber mat, glass fiber insulation, etc., of a specific manufacturer.

While molded fiberglass is a tremendously strong product, it is quite flexible, and in motor boat bottoms and other structures this flexibility may be undesirable. A great deal of thought has been given to the development of suitable stiffening means for molded fiberglass structures, including the use of plastic foam, cellular formations, a "blanket" made of balsa wood blocks adhesively secured to a resiliently flexible backing member, and others.

While some of the foregoing stiffening means have been quite satisfactory, most of them are quite expensive, and although they do tend to stiffen a molded fiberglass structure in which they are incorporated, some of them do not add substantially to its strength.

An object of the present invention is to provide an improved method for stiffening and strengthening selected portions of molded fiberglass structures.

Another object of the invention is to embed a layer of plywood blocks, of a size to conform substantially to the curvature of a molded fiberglass structure, between layers of glass fiber material saturated with activated resin and bonded to such molded fiberglass structure.

Another object of the invention is to apply a first layer of glass fiber material saturated with activated liquid resin to selected portions of a molded fiberglass structure, to apply a layer of plywood blocks to the saturated material while the first layer of resin is still in unset, liquid form, and then to apply a second layer of fiberglass material saturated with activated liquid resin over the layer of plywood blocks to seal and bond the blocks to the fiberglass structure and between the two layers of fiberglass material to provide a stiff, strong, substantially integrally bonded structure.

The foregoing objects and advantages of the invention will be apparent from the following description and the accompanying drawings, wherein:

FIG. 1 is a fragmentary, prespective view showing an operator applying a first layer of plastic-saturated chopped glass fiber material to the interior of the bottom of a molded fiberglass motor boat hull.

FIG. 2 is a fragmentary, perspective view showing a workman applying a layer of plywood blocks to the first layer of plastic saturated material applied as in FIG. 1.

FIG. 3 is a perspective view of an operator completing the application of plywood blocks to the bow portion of the hull bottom of FIGS. 1 and 2, and showing the use of smaller blocks for more sharply curved portions of the hull.

FIG. 4 is an enlarged, fragmentary, transverse, sectional view through a portion of the completed structure of FIG. 3, and showing how larger blocks are used for areas of the structure having a gradual curvature, and smaller blocks for more sharply curved areas thereof.

FIG. 5 is a top plan view of a building structure constructed in accordance with the present invention.

FIG. 6 is a view, partly in side elevation and partly in vertical section, taken along line 6—6 of FIG. 5.

FIG. 7 is an enlarged, transverse, sectional view taken along line 7—7 of FIG. 5.

BRIEF DESCRIPTION

Briefly, referring to the illustrative hull bottom structure of FIGS. 1-4, a selected portion of the interior of a molded fiberglass hull A to be stiffened and strengthened by means of the present invention is covered with a first layer 10 of glass fiber material, such as mat, roving, or fabric, saturated with a suitable resin, for example, polyester resin, which has been activated by a suitable catalyst in a well known manner. A layer of plywood blocks 11 is then laid, tile-like on the layer 10 of saturated fiberglass material, and this layer of blocks 11 is then completely covered and sealed in place by a second layer 12 (FIG. 4) of resin saturated glass fiber material.

DETAILED DESCRIPTION

Referring to the drawings in greater detail, and describing first the hull structure shown in FIGS. 1-4, the first layer 10 of glass fiber material may be conventional glass fiber material, such as, for example, glass cloth, woven roving, felt-like fabricated glass fiber mat or chopped fiber mat, all of which are well known types used throughout the fiberglass boat building and other industries. Any of these glass fiber materials may be bonded to the molded fiberglass structure to be stiffened, such as the hull A in any suitable or well known manner, such as, for example, that shown in FIG. 1. In the latter figure, a "chopper gun" B is constructed to feed a strand (not shown) of glass fiber roving into a rotatively driven chopping knife (also not shown) which chops the roving fibers into suitable lengths, for example, 1½ inches long, and discharges the chopped fibers, together with a spray of activated resin in the form of a high velocity steam B'.

A selected area of hull A is covered with the first layer 10 of a selected type of resin-saturated glass fiber material, the area thus covered being of a size to permit it to be completely covered with plywood blocks 11 before the resin with which the glass fibers are saturated sets up, or hardens. When such selected area has thus been covered with the first layer 10 of resin saturated glass fiber material, one or more workmen, such as the one 13 shown in FIGS. 2 and 3, apply thereto the layer of plywood blocks 11, which are cut from plywood of suitable thickness.

Where there is a variation in the sharpness of curvature between portions of an area to be reinforced in accordance with the present invention, and also for breaking the joints of successive rows of blocks as shown in FIGS. 1 and 2, the blocks 11 are supplied in a plurality of different sizes, such as, for example, the blocks 11a and 11b. The exact size or sizes of the blocks is not a feature of the invention, but for a hull of the order of that shown in FIGS. 1–3, for example, a suitable size block has been found to be of ⅜" thick plywood, with the larger blocks 11a of the order of five inches square, and the small blocks 11b of the order of two and one half inches square. The blocks should not be too large or they will not be "through-bonded" sufficiently by resin and fibers filling the joints, as is brought out later herein, and also will not conform closely enough to the curvature of the hull. However, they should not be too small, as that would involve unnecessary labor in laying them, and might also entail some loss of rigidity and structural strength. A few trials, or design calculations by ordinarily skilled builders or designers of molded fiberglass structures, will readily arrive at a satisfactory size or sizes of blocks for any desired installation.

The laying of the blocks preferably is started at the transom C in a transom-type boat, as shown in FIG. 2. A first row 14 of the larger blocks 11a is laid, preferably along some substantially straight member of the structure being reinforced, such as the keelson or strongback D starting with a full size block 11a at the transom C and continuing with the full size blocks 11a. As each successive block is laid, it preferably is initially positioned diagonally approximately one quarter of an inch away from its final position, and is then slidably moved, with sufficient downward pressure, into its final position adjacent either the keelson D, the transom C, or the next preceding block or blocks.

Downward pressure exerted on the blocks during their laying tends to compress the plastic saturated layer 10 of glass fiber material therebeneath, and thus to urge the block into either chordal or tangential relation with the molded fiberglass structure therebeneath. This same pressure tends to express some of the unset liquid resin out around the edges of the block being laid, and the sliding motion applied to the block forces some of this resin and even some of the glass fibers of the glass fiber material, up into the joint between each newly laid block and edgewise adjacent objtcts, thereby filling the joints with glass fiber reinforced resin to provide through-bonding and to eliminate voids.

After a first row 14 of the blocks has been laid to a selected distance on the first layer 10 of resin saturated glass fiber material, a second row 15 of blocks is started, preferably beginning with two smaller blocks 11b (FIG. 2). Thereafter, the second row 15 is continued with full size blocks 11a in the same manner as that described previously herein for the initial row 14. A third row 17 is then started with a full size block 11a, and so on, preferably alternating between beginning each new row with a full size block 11a and two half-size blocks 11b. Thus, the joints between adjacent rows of the blocks will be broken as shown in FIGS. 2 and 3 for maximum strength and rigidity.

The blocks 11 are easy to lay, and even an unskilled person soon attains proficiency in rapidly and properly laying them, so that a substantial area can be covered with each application of the first layer 10 of plastic saturated glass fiber material without danger of its setting up before the blocks to cover it are laid. As soon as each selected area of the molded fiberglass structure to be strengthened and stiffened by the present invention has been covered with a layer of the blocks 11, an additional selected area of the structure is similarly covered with a first layer 10 of the plastic saturated fiberglass, and a layer of blocks 11 is laid therein, and the process repeated until an entire desired portion of the molded structure has thus been covered with the embedded blocks 11.

An operator laying the blocks soon learns to recognize the preferred procedure, wherein the blocks are moved slidably a sufficient distance, and with sufficient downward pressure, to compress the first resin-saturated glass fiber layer 10 therebeneath toward full, contacting relation with the under side of each block 11, and to cause some of the saturating resin to show above the joints between each newly laid block and laterally adjacent objects, such as the transom C, keelson D, or adjacent blocks 11, thereby indicating that the joints are filled with resin. As an operator arrives in his block laying at a more sharply curved area of the molded structure being reinforced, for example, at some parts of the bow and near the chines of the hull bottom A, he changes to smaller blocks, such as those 11b as shown in FIGS. 2, 3, and 4 which conform more closely to such more sharply curved areas.

After a desired area has been covered with the layer of blocks 11, and bonded to the molded structure in which they are laid by the first fiberglass layer 10 as explained previously herein, the second layer 12 (FIG. 4) of plastic-saturated glass fiber material is applied over the blocks 11 in a suitable manner, for example, as explained for the first layer 10. The second layer 12 completely covers and seals the layer of blocks 11 thus sandwiched between the layers 10 and 12, and through-bonds the blocks 11 to the molded structure A upon which they are laid.

Since the setting up time of the activated resin with which the glass fiber layers 10 and 12 are saturated can be controlled by varying the amount of catalyst employed at a known temperature, it is preferred to employ sufficiently small quantities of catalyst for the first mat layer 10 so that the operator or operators laying the blocks 11 will have plenty of time to complete this operation before the saturating resin sets up. If it is desired to proceed as soon as possible with other steps of construction on the hull after the present invention has been incorporated therein, the resin for saturating the second glass fiber layer 12 can be activated with an increased amount of catalyst so that it will set up more rapidly.

FIGS. 1–3 show the present invention being embodied in a boat hull. However, the invention is important for other fiberglass structures which require stiffening and strengthening. In this connection, FIGS. 5–7 show the invention embodied in an ornamental and functional shelter E, erected over the intersection of two walkways, F and G.

The entire structure E can be formed of eight molded elements, four of the elements being in effect left hand portions similar to the portion 19 within vertical planes intersecting at the vertical center line of the structure E, and represented by the angle 21, 22, 23 of FIG. 5; and four of the elements being in effect right hand portions, similar to the portion 20 of the structure between the intersecting planes represented by the angle 21, 22, 24 of FIG. 5.

These eight elements can be molded in two similar, but reversed molds (not shown), and can be reinforced in accordance with the present invention as shown in FIG. 7, by a first layer 10' of glass fiber material saturated with activated resin, a layer of plywood blocks 11' and a second layer 12' of glass fiber material saturated with activated resin in the same general manner as described previously herein for the hull structure A of FIGS. 1–4. The details of the structure E of FIGS. 5–7 will be obvious to one conversant with the art from the foregoing brief description of FIGS. 5–7, and the detailed description of FIGS. 1–4 set forth previously herein.

The invention provides a simple, inexpensive structure and method for greatly increasing the strength and rigidity of selected areas of molded fiberglass structures. It can be practiced readily, and with a small amount of instruction, by relatively unskilled persons, and does not add greatly to either the total weight, cost, or the time required to build the structure.

The blocks 11 themselves can be rapidly, easily and cheaply produced, and since plywood is used widely in fiberglass boat and other types of building, and since substantial quantities of plywood scrap are usually available in small sizes which can be utilized for making the blocks, a large portion of the requirements for the blocks frequently can be supplied from such scrap.

While I have illustrated and described a preferred embodiment of the present invention, it will be understood, however, that various changes and modifications may be made in the details thereof without departing from the scope of the invention as set forth in the appended claims.

Having thus described the invention, what I claims as new and desire to protect by Letters Patent is defined in the following claims.

1. The method of stiffening and strengthening a selected portion of a molded fiberglass structure which comprises applying a first layer of glass fiber material, saturated with activated, unset, liquid resin to a selected surface portion of a molded fiberglass structure, applying a layer of plywood blocks, one at a time, to the inner surface of the first layer of resin saturated glass fiber material while the resin with which the first layer of glass fiber material is saturated is still unset, each newly laid block being initially applied to the first layer of resin saturated glass fiber material at a selected distance from an adjacent structure or previously laid block, and then moved slidably under downward pressure into more closely adjacent relation with such adjacent structure or previously laid block, hereby to embed each newly laid block toward overall contact with such resin saturated first layer of glass fiber material, and to express sufficient unset resin and glass fibers of the first layer thereof into the joint between the newly laid block and such adjacent structure or previously laid block to fill such joint, and then applying a second layer of glass fiber material saturated with activated, unset, liquid resin over the layer of plywood blocks to completely cover and seal the blocks, the resin and glass fibers filling the joints comprising a through-bonding for the sandwich construction thus formed.

References Cited

UNITED STATES PATENTS

| | | |
|---|---|---|
| 2,746,891 | 5/1956 | Doane. |
| 2,850,890 | 9/1958 | Rubenstein _____ 72—36 |
| 3,139,371 | 6/1964 | Sisko _____ 161—37 |

FOREIGN PATENTS

| | | |
|---|---|---|
| 626,852 | 7/1949 | Great Britain. |

ROBERT F. BURNETT, *Primary Examiner.*

W. A. POWELL, *Assistant Examiner.*